United States Patent
Zhang et al.

(10) Patent No.: US 12,542,316 B2
(45) Date of Patent: Feb. 3, 2026

(54) MULTILAYER COMPOSITE MATERIALS WITH ANISOTROPIC THERMAL CONDUCTIVITY FOR HIGH SAFETY PACK DESIGN

(71) Applicant: Hefei Gotion High-Tech Power Energy Co., Ltd., Hefei (CN)

(72) Inventors: Ya Zhang, Hefei (CN); Qian Cheng, Hefei (CN); Steven Cai, Hefei (CN)

(73) Assignee: HEFEI GOTION HIGH-TECH POWER ENERGY CO., LTD., Hefei (CN)

( * ) Notice: Subject to any disclaimer, the term of this patent is extended or adjusted under 35 U.S.C. 154(b) by 629 days.

(21) Appl. No.: 17/441,621

(22) PCT Filed: Mar. 21, 2019

(86) PCT No.: PCT/CN2019/078966
§ 371 (c)(1),
(2) Date: Sep. 21, 2021

(87) PCT Pub. No.: WO2020/186495
PCT Pub. Date: Sep. 24, 2020

(65) Prior Publication Data
US 2022/0131208 A1    Apr. 28, 2022

(51) Int. Cl.
*H01M 10/658*    (2014.01)
*H01M 10/647*    (2014.01)
(Continued)

(52) U.S. Cl.
CPC ....... *H01M 10/658* (2015.04); *H01M 10/647* (2015.04); *H01M 50/124* (2021.01);
(Continued)

(58) Field of Classification Search
CPC ......... H01M 10/613–658; H01M 50/124–133; H01M 2200/00; H01M 2200/20; H01M 10/647; H01M 50/126; H01M 50/131
See application file for complete search history.

(56) References Cited

U.S. PATENT DOCUMENTS 10,181,587 B2    1/2019    Ota et al.
10,637,038 B2    4/2020    Zagars et al.
(Continued)

FOREIGN PATENT DOCUMENTS

CN    103933900         7/2014
CN    105325067 A  *  2/2016    ............... H05K 7/20
(Continued)

OTHER PUBLICATIONS

Datasheet-Aerogel P200 particles (Year: 2021).*
(Continued)

*Primary Examiner* — Jonathan G Leong
*Assistant Examiner* — Kan Luo
(74) *Attorney, Agent, or Firm* — LOZA & LOZA, LLP; Michael Fedrick

(57) ABSTRACT

The present invention relates to multilayer composite materials with anisotropic thermal conductivity for high safety pack design. According to the present invention, the multilayer composite material has a sandwich structure, and comprises: an inner layer consisting of an aerogel material which has ultra-low thermal conductivity; and two thermal conduction layers which contain graphene based nano carbon and possess high thermal conductivity, wherein the inner layer is sandwiched by the two thermal conduction layers. When used as a spacer between two neighbor cell, the multi-layer composite material can help to achieve uniform (Continued)

thermal distribution, stop the thermal propagation and act as a spacer to accommodate the volumetric change during charge and discharge.

19 Claims, 3 Drawing Sheets

(51) Int. Cl.
*H01M 50/124* (2021.01)
*H01M 50/126* (2021.01)
*H01M 50/131* (2021.01)
*H01M 50/133* (2021.01)

(52) U.S. Cl.
CPC ....... *H01M 50/126* (2021.01); *H01M 50/131* (2021.01); *H01M 50/133* (2021.01)

(56) References Cited

U.S. PATENT DOCUMENTS

| | | | |
|---|---|---|---|
| 2005/0205548 A1 | 9/2005 | Olding et al. | |
| 2011/0159340 A1* | 6/2011 | Hu et al. | H01M 10/50 429/120 |
| 2013/0071717 A1* | 3/2013 | Muniz | H01M 10/50 429/120 |
| 2013/0264041 A1* | 10/2013 | Zhamu et al. | F28F 7/00 165/185 |
| 2016/0333572 A1* | 11/2016 | Samanta et al. | E04B 1/78 |
| 2017/0198187 A1* | 7/2017 | Lai et al. | C09K 5/14 |
| 2019/0023849 A1* | 1/2019 | Kotake | C08L 83/06 |

FOREIGN PATENT DOCUMENTS

| | | |
|---|---|---|
| CN | 107513168 | 12/2017 |
| CN | 107910462 | 4/2018 |
| CN | 108084971 | 5/2018 |
| CN | 108428809 | 8/2018 |
| CN | 108736102 A | 11/2018 |
| CN | 109251006 A | 1/2019 |
| JP | 2017533548 | 5/2016 |
| JP | 2018524759 | 12/2016 |
| WO | 2017106524 A1 | 6/2017 |

OTHER PUBLICATIONS

Yang etr al., CN105325067 A EPO machine translation (Year: 2016).*
International Search Report for corresponding International Patent Application No. PCT/CN2019/078966 dated Dec. 26, 2019.
Li, et al., "Silica aerogels with tailored chemical functionality", Materials and Design, vol. 193, May 2020, 108833 (12 Pages).
Extended European Search Report for corresponding European Patent Application No. 19920180.7, dated Feb. 8, 2023.
First Office Action for corresponding European Patent Application No. 19920180.7, dated Nov. 21, 2023.
Kwon, Y-G et al. "Ambient-Dried Silica Aerogel Doped With Ti02 Powder For Thermal Insulation", Journal Of Material Science, vol. 35, No. 24, pp. 6075-6079 (2000).
Office Action issued in corresponding Japanese patent application No. 2021-560147 mailed on Mar. 29, 2022.
Second Office Action for corresponding European Patent Application No. 19920180.7, dated Jul. 3, 2024.

* cited by examiner

MULTILAYER COMPOSITE MATERIALS WITH ANISOTROPIC THERMAL CONDUCTIVITY FOR HIGH SAFETY PACK DESIGN

CROSS-REFERENCE TO RELATED APPLICATIONS

This application is the U.S. national stage of International Patent Application No. PCT/CN2019/078966, filed on Mar. 21, 2019 and entitled MULTILAYER COMPOSITE MATERIALS WITH ANISOTROPIC THERMAL CONDUCTIVITY FOR HIGH SAFETY PACK DESIGN. The disclosure of the foregoing application is incorporated herein by reference in its entirety.

TECHNICAL FIELD

The present invention relates to multi-layer composite materials that used in pack design with pouch cells, which possess following three functions: 1. realizing uniform planar heat dissipation of pouch cell surface (x-y direction high thermal conductivity); 2. stopping the thermal propagation between cells (z direction ultra-low thermal conductivity). 3. acting as spacer between cells to have a proper pressure.

BACKGROUND ART

Over the last two decades, lithium ion batteries have become highly desired power source for new energy vehicle. The current commercially available lithium ion batteries with a graphite anode and layer-structure LiMO (M=Ni, Co, Mn binary or ternary system) cathode have a gravimetric energy more than 250 Wh/kg at the cell level. The industry is continuously pursing for even higher energy density (>300 Wh/kg).

Comparing with lithium ion phosphate batteries with relative lower energy density (160-180 Wh/kg), high nickel NCM or NCA based batteries have great advantages in terms of high energy density, especially in the form of pouch cell with lighter inactive materials can achieve an energy density up to 300 Wh/kg. However, the safety is a problem due to the high composition of chemical active substance and in-directional venting. Moreover, the uneven heat distribution of pouch cell during charging and discharging results in partial swelling, lithium dendrite development, uneven voltage distribution, partially overcharge, which is related to thermal runaway and bring more complexity of battery management system (BMS).

As a result, the pouch cell is expecting to have a high planar conductivity (x-y direction thermal conductivity). In addition, when a cell went thermal runaway, the heat should be shield to prohibit the neighboring cell from thermal runaway; thus, it is desirable to have a material that having low thermal conductivity between cells (z-direction). Thirdly, different from prismatic and cylindrical cell, pouch cell don't have a rigid case to hold the jelly roll. The cell usually has a 10% volumetric change during charging and discharging (cell breath); thus, it is expected to have a material that can be compressible in order to accommodate the volumetric change.

A thermal barrier film, which is made of a thermal insulation material such as glass fibers, asbestos fibers or silicates, is commonly used in the pouch cell pack to function as a thermal barrier and a flame retardant. However, it is commonly recognized in the art that such a thermal barrier film is thicker and has a relatively poor effect.

In the other aspect, an aerogel material is known to have ultra-low thermal conductivity, and has been used as a thermal insulation material. For example, CN 103933900A discloses a method for preparing a resorcinol-formaldehyde (RF) aerogel which can be used as a thermal insulation material. However, the aerogel, per se, is isotropic and cannot have a high planar conductivity while having a low thermal conductivity between cells.

CN 107513168A discloses a layered composite material having an expanded polytetrafluoroethylene layer, a graphene layer and a silicon aerogel layer, wherein the graphene layer and the silicon aerogel layer are provided on the opposite sides of the expanded polytetrafluoroethylene layer, respectively. However, the expanded polytetrafluoroethylene layer has a low expansion coefficient and thus has a low volume change during its use.

In view of above, it is still desirable in the art to develop a multi-layer composite material which meets the requirements of pouch cell pack design to enable a high safety pack design with pouch cell, and can solve the problems of (1) uneven thermal distribution at pouch cell surface; (2) thermal propagation in battery module/pack; and (3) spacer to accommodate volumetric change of pouch cell.

SUMMARY OF THIS INVENTION

The present invention is made in view of the above technical problems. In particular, in one aspect, an objective of the present invention is to provide a multi-layer composite material which is applicable as a thermal barrier material in the pouch cell pack and can meet the following requirements of pouch cell pack design: (1) high thermal conductivity in x-y direction; (2) ultra-low thermal conductivity in z direction; and (3) compressible to accommodate the volumetric change.

Another object of the present invention is to provide a pouch cell pack comprising the multi-layer composite material according to the present invention, which pouch cell pack can enable a high safety pack design and can have excellent electrical properties.

In the other aspect, an object of the present invention is to provide a method to prepare the multi-layer composite material according to the present invention.

To achieve the above purpose, in one aspect, there is provided a multi-layer composite material having a sandwich structure, comprising an inner layer consisting of an aerogel material which has an ultra-low thermal conductivity of 25 mW/m-K or less; and two thermal conduction layers which contain graphene based nano carbon and possess a high thermal conductivity of higher than 50 W/m-K, wherein the inner layer is sandwiched by the two thermal conduction layers.

There is also provided a pouch cell pack comprising a plurality of cells and spacers disposed between the two neighbor cells, wherein the spacer contains the multi-layer composite material according to the present invention.

There is also provided a device comprising the pouch cell pack according to the present invention.

In the other aspect, there is provided a method for preparing the multi-layer composite material according to the present invention, comprising a process of forming the inner layer of an aerogel material; and a process of applying the thermal conduction layers on both sides of the inner layer.

In some preferred embodiments, the process of forming the inner layer comprises the following steps:
(1) forming a stable solution of a precursor for forming the aerosol;
(2) gelating the solution by a polycondensation reaction;
(3) aging the sol as obtained in step (2); and
(4) subjecting the aged gel to a supercritical drying and shaping it into the desired form or shape.

According to the present invention, the multi-layer composite material can solve the above technical problems in the prior art and help to achieve uniform thermal distribution, stop the thermal propagation and act as a spacer to accommodate the volumetric change during charge and discharge. In addition, the pouch cell pack comprising the multi-layer composite material can enable a high safety pack design and have excellent electrical properties.

BRIEF DESCRIPTION FOR THE DRAWINGS

The accompanying drawings, which are included to provide a further understanding of the invention and are incorporated as a part of this specification, illustrate embodiments of the invention and together with the description serve to explain the principles of the invention. In the drawings.

MODES FOR CARRYING OUT THE INVENTION

Hereinafter, embodiments of the present invention will be described in detail with reference to the accompanying drawings such that the technical idea of the present invention can be easily realized by those skilled in the art. It should be understood that the present invention is not limited to the following embodiments and may be embodied in different ways.

In the present invention, the term "multi-layer composite material" and "thermal barrier material" may have the same meanings and is exchangeably used hereinafter.

The present invention provides a multi-layer composite material having a sandwich structure, comprising an inner layer consisting of an aerogel material which has an ultra-low thermal conductivity of 25 mW/m-K or less; and two thermal conduction layers which contain graphene based nano carbon and possess a high thermal conductivity of higher than 50 W/m-K, wherein the inner layer is sandwiched by the two thermal conduction layers.

Figure 1:
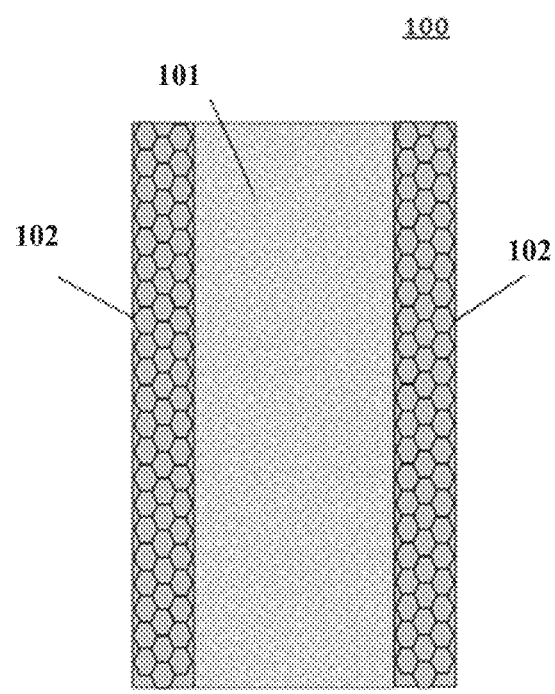
FIG. 1 is a schematic cross-section of the multi-layer composite material according to the present invention.

FIG. 1 is a schematic cross-section of the multi-layer composite material according to the present invention.

As shown in FIG. 1, the multi-layer composite material 100 includes an inner layer 101 of an aerogel material, which is sandwiched by two thermal conduction layers 102. That is to say, the inner layer 101 is applied with two thermal conduction layers 102 on its opposite sides.

The inner layer 101 is made of an aerogel material having a proper porosity and thickness so that the inner layer 101 may have a thermal conductivity as low as 25 mW/m-K or less.

An aerogel material has an ultra-low thermal conductivity because it has a high porosity. It is known that the thermal conduction is operated mainly by three ways of gas conduction, solid conduction and radiative conduction. Among these, gas conduction has the least amount of heat that can be transferred since most of gases have a very low thermal conductivity. Thus, it is common that most thermal insulation materials have a porous structure in which air occupies partial volume of a solid material so that the whole thermal conductivity of the material can be lowered down.

The aerogel material according to the present invention has a porosity much higher than those of most common thermal insulation materials. The porosity of the aerogel material can be expressed in terms of air volumetric percentage (%). In some embodiments, the aerogel material can have an air volumetric percentage of larger than 95%, preferably larger than 97% and more preferably than 99%. In some embodiments, the aerogel material may have a pore size of 100 nm or less, more preferably 50 nm or less, most preferably 10 nm or less.

The aerogel material according to the present invention may has a thickness of about 100 μm or more, preferably about 200 μm or more, and more preferably about 400 μm or more. If the thickness is less than 100 μm, a desired thermal barrier effect may be not obtained. The upper limit for the thickness is not specifically limited, but preferably 1000 μm or less, more preferably 900 μm or less, in view of the ease of its manufacture and size-matching to the pouch cell.

As above described, the aerogel material according to the present invention has a thermal conductivity of 25 mW/m-K or less, more preferably 5 mW/m-K or less. If the thermal conductivity is larger than 25 mW/m-K, a desired thermal barrier effect may be not obtained.

In some embodiments, the aerogel material can be made from a nano-size material selected from silica, titanium oxide, chrome oxide, iron oxide, vandia, neodymium oxide, samaria, holmia, carbon (including carbon nanotubes), or any other metal oxide, or any combination thereof. More preferably, the aerogel material is made from silica, titanium oxide, carbon or any combination thereof. Most preferably, the aerogel material is made from silica. Here, the term "nano size" means that the material has a particle size in a nano scale, such as a particle size of 500 nm or less, preferably 100 nm or less, more preferably 50 nm or less.

In other embodiments, the aerogel material contains the above-listed aerogel-forming materials as the main components and additives. In the case that an additive is included, the aerogel material may contain about 60% to 90% by weight of the aerogel-forming material, based on the total weight of the aerogel material. The additives may function to enhance the structure stability or cohesion of the aerogel material, or provide other physical benefits. For example, the aerogel material may include glass fibers as a binder to enforce the composite material with proper mechanical strength, such as glass fibers with the length of 10 μm to 2 mm. In addition, radiative thermal conduction may occur, especially at high temperature. Thus, usually the aerogel material may include opacifiers such as SiC, $TiO_2$ or carbon black to stop the heat radiation. The opacifier may be in a form of single crystal or multi-crystal. The opacifier may be in a form of particle and may have a particle size of 1 μm to 50 μm. The particle size can be measure by a laser particle size analyzer such as HORIBA LA-960. Here, the particle size may refer to a secondary particle size of multi-crystal particles.

In some embodiments, the aerogel material according to the present invention may contain about 60% to 90% by weight of the aerogel-forming material (such as $SiO_2$ having a particle size of 10 nm or a combination of nano-size $SiO_2$ and nano-size $TiO_2$), 5% to 30% by weight of SiC having a particle size of such as 20 μm and 2% to 10% by weight of glass fiber with a length of 100 μm, based on the total weight of the aerogel material.

The aerogel material according to the present invention may not only provide an ultra-low thermal conductivity, but also have advantages such as low light weight and high thermal stability, thus can be useful in the present invention.

The aerogel is usually made of so-gel polymerization, in which monomers for forming the frame of the aerogel react with each other to form a sol that consists of bonded, cross linked macromolecules, with deposits of liquid solution filling the cells within the macromolecules.

Then, when the resultant is subjected to supercritical drying under a supercritical condition. The supercritical condition is not particularly limited and the supercritical drying may be conducted at a condition commonly used in the art. For example, the aged gel may be incubated at supercritical temperature above the critical temperature of a supercritical drying medium to obtain an aerogel. The supercritical drying medium may be selected from carbon dioxide, methanol or ethanol, and may be preferably carbon dioxide. The supercritical drying may be conducted at a supercritical temperature of 30 to 60° C., preferably of 40 to 45° C., under a pressure of 1.01 MPa or more (preferably 5.06 MPa or more, more preferably 7.38 MPa or more), over a holding time of 2 to 5 h, preferably 2 to 3 h.

During the supercritical drying, the liquid solution is evaporated out and a bonded, cross linked macromolecule frame is left behind. In order to have low solid conduction, the resultant should have a small particle size (5 to 20 nm) which enable high contact resistance and tortuous heat path through the sold matrix. This decreases the rate at which heat can flow by solid conduction. Regarding to the gas conduction, since the nanomaterials (such as fumed $SiO_2$) has a pore size less than the average free transportation path of air molecular (74 nm), it may have low convective heat transfer.

In addition, the aerogel material according to the present invention has an extremely low shrinkage at a high temperature. For example, the aerogel material may have a shrinkage of less than 0.5%, preferably less than 0.1% and more preferably about 0%, after it is heated at 600° C. for 24 hours. Furthermore, the aerogel material may have a shrinkage of less than 2%, preferably less than 1.5% and more preferably less than 1%, after it is heated at 900° C. for 24 hours.

According to the present invention, the aerogel material may be deformed when it is subjected to a compression force applied by the neighbor cells due to thermal expansion during operation of a battery. Specifically, the aerogel material according to the present invention has a compression set of 10% or more, preferably 10% to 15%, in a compression experiment in which a load of 10 kg (5×5 $mm^2$) is applied to a test piece having a size of 3×3 $mm^2$ and a thickness of 1 mm for 1 h.

The formation of the aerogel material involves a solution for forming the aerogel material, which contains monomers for forming the frame of the aerogel, a solvent and optionally additives as above described.

The solvent for forming the aerogel material is not particularly limited, and any solvent for forming an aerogel as commonly used in the art can be used. For example, the solvent may be an aqueous liquid such as water or water/ethanol mixture, or an organic solvent such as propylene carbonate, ethylene carbonate, diethylene carbonate, dimethyl carbonate, or an ionic liquid such as 1-ethyl-3-methylimidazolium bis[(trifluoromethyl)sulfonyl]amide.

A specific process for preparing the aerogel material according to the present invention will be described in the following paragraphs.

As above described, the inner layer 101 of an aerogel material is sandwiched by two thermal conduction layers 102. As shown in FIG. 1, the inner layer 101 is applied with two thermal conduction layers 102 on its opposite sides.

The thermal conduction layer 102 is a graphene based layer having a high thermal conductivity, which contains graphene and optionally other kinds of nano carbon as an auxiliary component.

The graphene based layer may have a thermal conductivity of 50 W/m-K or more, preferably 75 W/m-K or more and more preferably 100 W/m-K or more. If the thermal conductivity of the graphene based layer is lower than 50 W/m-K, the desired in-plane conductive effect cannot be obtained.

A graphene layer is a two-dimensional allotrope of carbon with a single layer of graphene including a single planar sheet of sp2-hybridized carbon atoms. Graphene is known for its exceptionally high intrinsic strength, resulting from the two-dimensional (2D) hexagonal lattice of covalently bonded carbon atoms. Further, graphene also displays a number of other advantages such as high conductivity and high thermal conductivity in the layer plane.

The graphene based layer according to the present invention contains graphene powder, which can be produced from physically exfoliated graphene, reduced graphene oxide and graphene oxide etc. The graphene powder may have a particle size of 50 to 5000 mesh. The graphene can be a single layer or multilayers having a number of layers of 2 to 50, and the thickness of the graphene layer is less than 10 μm, preferably less than 100 nm.

The graphene based layer can be applied to the surface of the inner layer by a common coating process optionally with a binder. A binder can be used to achieve high mechanical reliability. The binder may be poly(acrylic acid), poly(vinylidene fluoride), styrene-butadiene rubber, et al. When a binder in used, it may be included in an amount of 2% to 20% by weight based on the total weight of the graphene based layer.

The coating process is not particularly limited as long as it would not affect the desired properties of the graphene layer according to the present invention. For example, as the coating process, a spin coating process, a blade coating process or a casting process may be used.

For example, in one embodiment, the graphene based layer can be applied to the surface of the inner layer by spin coating with 15 wt % acrylic acid or acrylate as a binder.

Preferably, a nano carbon material other than graphene is also included in the graphene layer so that the graphene layer contains a composite material. The nano carbon material is not particularly limited, and may be fullerene, carbon quantum dot, carbon nano tube or carbon nano rod. Among these, it is more preferable to use carbon nano tube as the nano carbon material. The carbon nano tube is a one-dimensional material and may be classified into a single wall carbon nano tube (SWCNT) and a multiple wall carbon nano tube (MWCNT). The single wall carbon nano tube is more preferably used as the nano carbon material. Preferably, the single wall carbon nano tube has a length of larger than 50 nm.

When graphene and a carbon nano tube is combined to form the graphene based layer, a binder-free high conductive layer can be formed and applied to both sides of the inner layer. In addition, when graphene (2D material) and a carbon nano tube (one-dimensional material) is combined, a 3D porous material may be produced, which may absorb the volumetric contraction resulting from the charging/discharging process of a battery, thus a volumetric compliance can be easily obtained. In addition, such a 3D porous material may have a better thermal conductivity, as compared with the layer comprising graphene only.

When a nano carbon material other than graphene is included, the nano carbon material may be used in an amount of 10% to 30% by weight based on the total weight of the graphene based layer. For example, the graphene based layer may be prepared by mixing single wall carbon nano tube and graphene at 1:3 wt %, wherein SWCNT may function as a binder to obtain a binder free coating.

The coating solution for forming the graphene based layer may contain graphene powder, a solvent, optionally a nano carbon material other than graphene, and optionally a binder.

The solvent for forming the graphene based layer is not particularly limited, and any solvent as commonly used in the art can be used. For example, the solvent may be water, ethanol, N-methylpyrrolidone, or combinations thereof.

According to the present invention, the thermal barrier material is prepared by a method comprising a process of forming the inner layer of an aerogel material; and a process of applying the thermal conduction layers on both sides of the inner layer.

Generally, the process of forming the inner layer comprises the following steps:
 (1) forming a stable solution of a precursor for forming the aerosol;
 (2) gelating the solution by a polycondensation reaction;
 (3) aging the sol as obtained in step (2); and
 (4) subjecting the aged gel to a supercritical drying and shaping it into the desired form or shape.

Specifically, in step (1), a stable solution of a precursor for forming the aerosol is formed. As above described, the precursor may be a nano-sized material selected from silica, titanium oxide, chrome oxide, iron oxide, vandia, neodymium oxide, samaria, holmia, carbon (including carbon nanotubes), or any other metal oxide, or any combination thereof, as above described. In addition, an opacifier such as SiC, $TiO_2$ or carbon black or a binder such as glass fibers, as additives, may be included in the solution. Thus, in one embodiment, step (1) may involve formation of a stable solution of a precursor, an opacifier and a binder.

The method for forming the stable solution is not particularly limited, and any proper method may be used as long as it would not affect the desired properties according to the present invention. For example, the precursor and the optional additives may be dissolved or dispersed in a solvent selected from an aqueous liquid such as water, and water/ethanol mixture, and an organic solvent such as N-methylpyrrolidone and propylene carbonate.

According to the present invention, preferably, the step (1) involves preparing a stable silicate solution with water.

Next, in step (2), the solution containing the nano-sized precursor may be gelated by forming oxide- or alcohol-bridged network by a polycondensation reaction. As a result, the viscosity of the solution is dramatically increased.

According to the present invention, preferably, the polycondensation reaction may be initiated by changing pH of the solution. Specifically, an alkaline solution may be added to the solution to adjust the pH of the solution containing the nano-sized precursor. The alkaline solution is not particularly limited in the present invention, and examples thereof may include a solution of an alkali metal hydroxide such as NaOH or KOH, a solution of an alkali earth metal hydroxide such as MgOH and a solution of carbonate such as $Na_2CO_3$.

The targeted pH is also not limited and may be determined according to the types of the nano-sized precursor.

For example, according to the present invention, when the nano-sized precursor is silicate and titanate, an alkaline solution such NaOH may be used to adjust the pH of the solution to 3-4 to form a $SiO_2/TiO_2$ sol.

Next, in step (3), the obtained gel is aged, during which the polycondensation reaction continues until the sol transforms into a gel, accompanied by contraction of the gel network and expulsion of solvent from gel pores. The aging process is critical to prevention of cracks in the gel that has been formed.

The aging process may be carried out at a temperature of 45 to 60° C., preferably 50 to 55° C. for a time period of 8 to 24 hours, preferably 8 to 10 hours.

For example, in a case of forming a $SiO_2/TiO_2$ sol in step (2), the $SiO_2/TiO_2$ sol may be aged at 50° C. for 10 hours to form a gel.

Next, in step (4), the obtained gel is subjected to a supercritical drying and then shaped into the desired form or shape. In this step, the solvent will be removed.

As above described, the aged gel may be incubated at supercritical temperature above the critical temperature of a supercritical drying medium to obtain an aerogel. The supercritical drying medium may be selected from carbon dioxide, methanol or ethanol, and may be preferably carbon dioxide. The supercritical drying may be conducted at a supercritical temperature of 30 to 60° C., preferably of 40 to 45° C., over a holding time of 2 to 5 h, preferably 2 to 3 h.

For example, in a case of forming a $SiO_2/TiO_2$ gel in step (3), the aged gel may be incubated in a supercritical $CO_2$ medium at a supercritical temperature of 50° C. for 2 h to form a $SiO_2/TiO_2$ aerogel.

By the above steps (1) to (4), an aerogel material having the desired porosity and thickness can be obtained, and left for further use.

According to the present invention, the process for preparing the thermal barrier material may still include step (5) for applying the thermal conduction layers on both sides of the inner layer.

In step (5), a graphene based layer, such as a graphene layer with a binder or a binder-free layer, such as graphene/SWCNT (3:1 wt %) composite layer, is applied on both sides of the aerogel. As described above, a coating solution for forming the graphene based layer may be prepared and applied to both sides of the aerogel in this step. The coating solution is dried to remove the solvent therein to leave a graphene based layer on both sides of the aerogel, so that the thermal barrier material according to the present invention can be formed via the steps (1) to (5).

According to the present invention, in the other aspect, a pouch cell pack is provided which comprises a plurality of cells and spacers between two of the cells, wherein the spacer contains the thermal barrier material according to the present invention.

Figure 2:
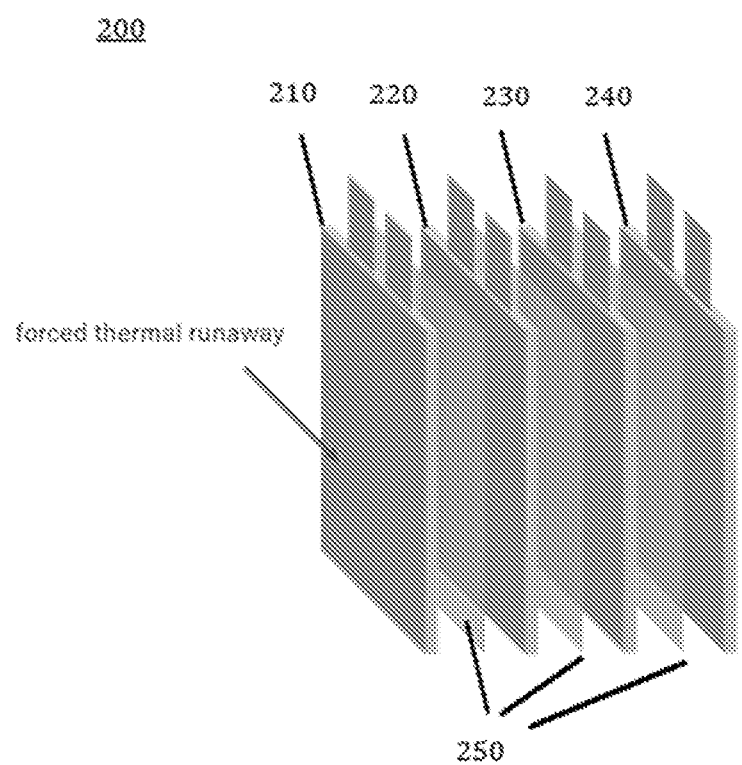
FIG. 2 is a perspective view schematically illustrating the structure of a battery module for test in Comparative Example 3 and Examples 5 to 6.

That is to say, the thermal barrier material can be used as a cushioning material between pouch cells. For example, the thermal barrier material may be a thermal barrier sheet or film in the pouch cell pack. When a cell goes to thermal runaway, it can protect the neighbor cell from heat spreading (as shown in FIG. 2).

As a cell unit in the pouch cell pack, a pouch cell may have common configuration used in the art, and is not particularly limited. For example, the pouch cell may be a lithium polymer cell such a lithium ion polymer cell or a lithium metal polymer cell. Usually, the pouch cell contains a positive electrode, a negative electrode and an electrolyte.

Different from prismatic cells and cylindrical cells that have a hard metal case, in a pouch cell, the jelly roll is packaged by a soft aluminum laminate film having a thickness of 100 to 150 μm, which made by lamination of polyethylene terephthalate, aluminum metal foil and polypropylene.

According to the present invention, there is also provided a device comprising the pouch cell pack according to the present invention. The pouch cell pack is used as a power supply of the device. For example, the device may be one or more of electric vehicles including electric vehicles (EV), hybrid electric vehicles (HEV) or plug-in hybrid electric vehicles (PHEV).

EXAMPLES

Hereinafter, the embodiments are described in detail using examples but are not limited by the examples.

Comparative Example 1

Mica (IEC-60371-2, AXIM MICA) with a thickness of 0.5 mm was used as a thermal barrier film.
The thermal barrier film was placed on a hot plate, with one side thereof contacted the hot plate, and heated to 600° C. for 300 s. The temperature of the other side of the thermal barrier film was recorded. The result is listed in the below table 1.

Comparative Example 2

Mica with a thickness of 1 mm was used as a thermal barrier film.
The thermal barrier film was placed on a hot plate, with one side thereof contacted the hot plate, and heated to 600° C. for 300 s. The temperature of the other side of the thermal barrier film was recorded. The result is listed in the below table 1.

Example 1

Preparation of a $SiO_2/TiO_2$ Aerogel
A $SiO_2/TiO_2$ aerogel was prepared by the steps (1) to (4) as follows:
 (1). First, 4 g $Na_4SiO_4$ (Sigma Aldrich) and 3 g $Na_2Ti_3O_7$ (Sigma Aldrich) were weighed and added to 100 ml of distilled water, stirred well to prepare a stable aqueous solution of $Na_4SiO_4$ and $Na_2Ti_3O_7$.
 (2). An alkaline solution (1 M KOH, Sigma Aldrich) was slowly added into the stable solution to adjust pH of the stable solution to 3.5 to form a $SiO_2/TiO_2$ sol.
 (3). The obtained $SiO_2/TiO_2$ sol was aged in water for 10 h to form a gel.
 (4). The aged gel was incubated in a supercritical $CO_2$ medium at a supercritical temperature of 50° C. and a supercritical pressure for 2 h to form a $SiO_2/TiO_2$ aerogel.

By the above steps (1) to (4), an aerogel containing 72 wt % of $SiO_2/TiO_2$ was obtained. In addition, 25 wt % of SiC (opacifier, Sigma Aldrich, 378097) and 3 wt % of glass fiber (binder, Asashi Kasei, PA66) was also added in step (1). The obtained $SiO_2/TiO_2$ aerogel was used as the inner thermal barrier layer with a thickness of 0.5 mm.
Preparation of a Graphene Based Layer
A coating solution containing graphene powder (900552, Sigma Aldrich) and acrylic acid (147230, Sigma Aldrich) as a binder was prepared so that the ratio of graphene and binder in the final coating layer is 95:5 by weight. The coating solution was applied on the both sides of the obtained aerogel as above prepared, then dried to obtain a coating layer having high thermal conductivity. The thickness of coating layer was 0.05 mm on each side.

The obtained multi-layer composite material was placed on a hot plate, with one side thereof contacted the hot plate, and heated to 600° C. for 300 s. The temperature of the other side of the multi-layer composite material was recorded. The result is listed in the below table 1.

Example 2

The multi-layer composite material was prepared by the same process as that described in Example 1, except that the obtained aerogel is prepared to have a thickness of 0.9 mm.
The obtained multi-layer composite material was placed on a hot plate, with one side thereof contacted the hot plate, and heated to 600° C. for 300 s. The temperature of the other side of the multi-layer composite material was recorded. The result is listed in the below table 1.

Example 3

The multi-layer composite material as prepared in Example 1 is used in this Example.
The obtained multi-layer composite material was placed on a hot plate, with one side thereof contacted the hot plate, and heated to 600° C. for 600 s. The temperature of the other side of the multi-layer composite material was recorded. The result is listed in the below table 1.

Example 4

The multi-layer composite material as prepared in Example 2 is used in this Example.
The obtained multi-layer composite material was placed on a hot plate, with one side thereof contacted the hot plate, and heated to 600° C. for 600 s. The temperature of the other side of the multi-layer composite material was recorded. The result is listed in the below table 1.

TABLE 1

Results of Comparative Example 1-2, and Examples 1-4.

| Examples | Thickness of thermal barrier material | Heating time | Temperature of the hotplate surface | Surface temperature of thermal barrier materials after heating |
|---|---|---|---|---|
| Comparative example 1 | 0.5 mm | 300 s | 600° C. | 576° C. |
| Comparative example 2 | 1.0 mm | 300 s | 599° C. | 530° C. |
| Example 1 | 0.5 mm | 300 s | 600° C. | 237° C. |
| Example 2 | 1.0 mm | 300 s | 600° C. | 194° C. |
| Example 3 | 0.5 mm | 600 s | 600° C. | 298° C. |
| Exanlple 4 | 1.0 mm | 600 s | 601° C. | 256° C. |

As seen from table 1, Examples 1-2 having the multi-layer composite material according to the present invention has a much lower temperature at the side opposite to the hot plate after heated at 600° C. for 300 s, as compared with Comparative Examples 1-2. Even if the multi-layer composite material according to the present invention is heated at 600° C. for 600 s (Examples 3-4), the temperatures at the side opposite to the hot plate are still much lower than those in Comparative Examples 1-2. Therefore, it is proved that the multi-layer composite material has an excellent thermal insulation in z direction, as compared with the conventional thermal barrier materials.

Comparative Example 3

Mica with thickness of 1 mm was used as a thermal barrier film.

As shown in FIG. 2, a battery module 200 with 4 pouch cells (250 Wh/kg, 550 Wh/L) was used as test vehicle. Cell 1, cell 2, cell 3 and cell 4 are designated to 210, 220, 230 and 240 in FIG. 2, and arranged parallelly. One thermal barrier film 250 was interposed between two cells. Thus, totally 3 pieces of thermal barrier films were used in this module.

In the test, cell 1 was forced to have thermal runaway. The waiting times to thermal runaway of the rest of the cells were recorded. The 4 pouch cells were placed in a large enough open space, so that the hot gas from the thermal runaway cell would not affect the neighboring cells. As a result, the neighboring cells can only be ignited by the thermal transfer of the cell which have thermal runaway.

The result of Comparative Example 3 is shown in Table 2.

Example 5

The multi-layer composite material as prepared in Example 1 is used as the thermal barrier film in this Example.

As shown in FIG. 2, a battery module 200 with 4 pouch cells (250 Wh/kg, 550 Wh/L) was used as test vehicle. Cell 1, cell 2, cell 3 and cell 4 are designated to 210, 220, 230 and 240 in FIG. 2, and arranged parallelly. One thermal barrier film 250 was interposed between two cells. Thus, totally 3 pieces of thermal barrier films were used in this module.

In the test, cell 1 was forced to have thermal runaway. The waiting times to thermal runaway of the rest of the cells were recorded. The 4 pouch cells were placed in a large enough open space, so that the hot gas from the thermal runaway cell would not affect the neighboring cells. As a result, the neighboring cells can only be ignited by the thermal transfer of the cell which have thermal runaway.

The result of Example 5 is shown in Table 2.

Example 6

The multi-layer composite material as prepared in Example 2 is used as the thermal barrier film in this Example.

As shown in FIG. 2, a battery module 200 with 4 pouch cells (250 Wh/kg, 550 Wh/L) was used as test vehicle. Cell 1, cell 2, cell 3 and cell 4 are designated to 210, 220, 230 and 240 in FIG. 2, and arranged parallelly. One thermal barrier film 250 was interposed between two cells. Thus, totally 3 pieces of thermal barrier films were used in this module.

In the test, cell 1 was forced to have thermal runaway. The waiting times to thermal runaway of the rest of the cells were recorded. The 4 pouch cells were placed in a large enough open space, so that the hot gas from the thermal runaway cell would not affect the neighboring cells. As a result, the neighboring cells can only be ignited by the thermal transfer of the cell which have thermal runaway.

The result of Example 6 is shown in Table 2.

TABLE 2

Results of Comparative Example 3, and Examples 5-6.

| | Thickness of multilayer composition material | Time to thermal runaway | | |
|---|---|---|---|---|
| | | Cell 2 | Cell 3 | Cell 4 |
| Comparative example 3 | 1 mm | 2 m 3 s | 5 m 25 s | 7 m 39 s |
| Example 5 | 0.5 mm | 8 m 56 s | 20 m 47 s | 31 m 12 s |
| Example 6 | 1.0 mm | 15 m 21 s | 37 m 49 s | / |

Seen from table 2, as compared with Comparative Example 3, the thermal barrier film of Example 6 having the same thickness can effect to have remarkably longer waiting times to thermal runaway of cells 2 and 3. Cell 4 in Example 6 had no thermal runaway during the test, while cell 4 in Comparative Example 3 went to thermal runaway in a time of less than 8 mins. Further, the thermal barrier film of Example 6 having only a half of the thickness in Comparative Example 3 also have remarkably longer waiting times to thermal runaway of cells 2 to 4, which means a much improved thermal insulation property as compared to the conventional material in the art. It is known that an improvement of several minutes in the waiting time to thermal runaway is a large improvement in the art.

Comparative Example 4

Mica with thickness of 0.5 mm was used as a thermal barrier film.

Figure 3:
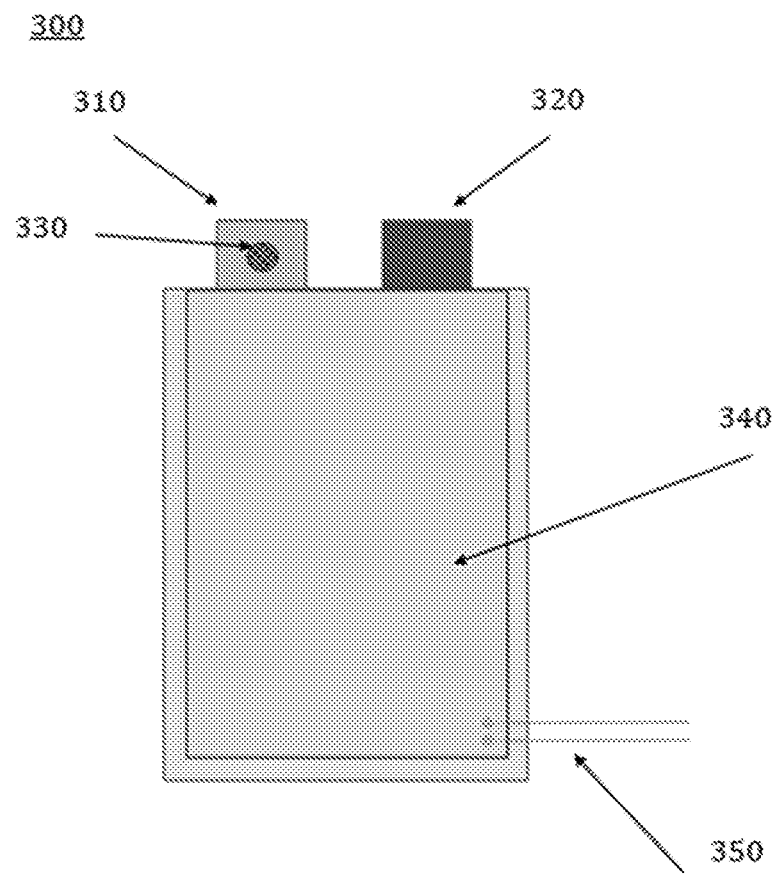
FIG. 3 is a schematic diagram of the pouch cell for text in Comparative example 4 and Example 7-10.

A pouch cell (250 Wh, 550 Wh/L, 261 mm×216 mm×7.91 mm) was used in the experiment. As shown in FIG. 3, a thermal barrier film 340 was attached on the outer lateral surface of the pouch cell 300. A heater 330 is attached on the surface of anode tab 310 while the reference number 320 refers to a cathode tab. A thermal couple 350 was placed on the bottom of pouch and under the thermal barrier film 340. The cell was charged in SOC50. The heater was heated to 70° C. and the temperature at the bottom thermal couple is recorded in 1 min, 5 mins, 10 mins and 30 mins. The result of Comparative Example 4 is shown in Table 3.

Example 7

The multi-layer composite material as prepared in Example 1 is used as the thermal barrier film in this Example.

A pouch cell (250 Wh, 550 Wh/L, 261 mm×216 mm×7.91 mm) was used in the experiment. As shown in FIG. 3, a thermal barrier film 340 was attached on the outer lateral surface of the pouch cell 300. A heater 330 is attached on the surface of anode tab 310 while the reference number 320 refers to a cathode tab. A thermal couple 350 was placed on the bottom of pouch and under the thermal barrier film 340. The cell was charged in SOC50. The heater was heated to 70° C. and the temperature at the bottom thermal couple is recorded in 1 min, 5 mins, 10 mins and 30 mins. The result of Example 7 is shown in Table 3.

Example 8

A multi-layer composite material was prepared in the same manner with that in Example 1, except that the graphene coating layers on the both sides of the obtained aerogel had a thickness of 0.1 mm.

A pouch cell (250 Wh, 550 Wh/L, 261 mm×216 mm×7.91 mm) was used in the experiment. As shown in FIG. 3, a thermal barrier film 340 was attached on the outer lateral surface of the pouch cell 300. A heater 330 is attached on the surface of anode tab 310 while the reference number 320 refers to a cathode tab. A thermal couple 350 was placed on the bottom of pouch and under the thermal barrier film 340. The cell was charged in SOC50. The heater was heated to 70° C. and the temperature at the bottom thermal couple is recorded in 1 min, 5 mins, 10 mins and 30 mins. The result of Example 8 is shown in Table 3.

Example 9

The inner layer of the aerogel was prepared in the same manner with that in Example 1.
Preparation of a Graphene Based Layer A coating solution containing graphene powder (900552, Sigma Aldrich) and acrylic acid (147230, Sigma Aldrich) was prepared so that the ratio of graphene and single wall carbon nano tube in the final coating layer is 70:30 by weight. The coating solution was applied on the both sides of the obtained aerogel as above prepared, then dried to obtain a coating layer having high thermal conductivity. The thickness of coating layer was 0.1 mm on each side.

Thus, a multi-layer composite material was obtained as the thermal barrier film.

A pouch cell (250 Wh, 550 Wh/L, 261 mm×216 mm×7.91 mm) was used in the experiment. As shown in FIG. 3, a thermal barrier film 340 was attached on the outer lateral surface of the pouch cell 300. A heater 330 is attached on the surface of anode tab 310 while the reference number 320 refers to a cathode tab. A thermal couple 350 was placed on the bottom of pouch and under the thermal barrier film 340. The cell was charged in SOC50. The heater was heated to 70° C. and the temperature at the bottom thermal couple is recorded in 1 min, 5 mins, 10 mins and 30 mins. The result of Example 9 is shown in Table 3.

Example 10

The inner layer of the aerogel was prepared in the same manner with that in Example 1.
Preparation of a Graphene Based Layer A coating solution containing a single wall carbon nano tube (Sigma Aldrich, 704121) was prepared. The coating solution was applied on the both sides of the aerogel as above prepared, then dried to obtain a coating layer having high thermal conductivity. The thickness of coating layer was 0.1 mm on each side.

Thus, a multi-layer composite material was obtained as the thermal barrier film.

A pouch cell (250 Wh, 550 Wh/L, 261 mm×216 mm×7.91 mm) was used in the experiment. As shown in FIG. 3, a thermal barrier film 340 was attached on the outer lateral surface of the pouch cell 300. A heater 330 is attached on the surface of anode tab 310 while the reference number 320 refers to a cathode tab. A thermal couple 350 was placed on the bottom of pouch and under the thermal barrier film 340. The cell was charged in SOC50. The heater was heated to 70° C. and the temperature at the bottom thermal couple is recorded in 1 min, 5 mins, 10 mins and 30 mins. The result of Example 10 is shown in Table 3.

TABLE 3

Results of Comparative Example 4, and Examples 7-10.

| | After 1 min | After 5 min | After 10 min | After 30 min |
|---|---|---|---|---|
| Comparative example 4 | 25° C. | 27° C. | 34° C. | 47° C. |
| Example 7 | 25° C. | 29° C. | 40° C. | 58° C. |
| Example 8 | 25° C. | 30° C. | 42° C. | 63° C. |
| Example 9 | 25° C. | 32° C. | 46° C. | 65° C. |
| Example 10 | 25° C. | 28° C. | 38° C. | 57° C. |

As can be seen from table 4, as compared with Comparative Example 4, Example 7-9 have much higher bottom temperatures after 5, 10 and 30 mins, which means that the graphene based layer has re-distribute heat via its good x-y plane thermal conductivity, so that the heat can be dissipated outside of the cell pack. In addition, comparing Example 7 to 9, it can be seen that Example 9 having a combination of graphene and carbon nano tube may realize a highest temperature at its bottom, which means that a better technical effect in terms of x-y plane thermal conduction and z-direction thermal insulation can be obtained by the combination of graphene and carbon nano tube.

Example 11

The aerogel as prepared in Example 1 is used in this example. The obtained aerogel was divided to three test pieces having the same sizes.
Measurement of Shrinkage The obtained aerogel is subjected to the shrinkage measurement according to ASTM C356 and the dedicated "in-house" techniques. In this method of "full soak" exposure, the tested materials are completely immersed and heated to 100° C., 600° C., 900° C. for a period of 24 hours, respectively, after which the dimensional changes are measured. The result of Example 11 is shown in Table 4.

Example 12

An aerogel was prepared in the same manner with that in Example 1, except that the obtained aerogel contains 63 wt % of $SiO_2/TiO_2$, 34 wt % of SiC and 3 wt % of glass fiber. The obtained aerogel was divided to three test pieces having the same sizes.
Measurement of Shrinkage The obtained aerogel is subjected to the shrinkage measurement according to ASTM C356 and the dedicated "in-house" techniques. In this method of "full soak" exposure, the tested materials are completely immersed and heated to 100° C., 600° C., 900° C. for a period of 24 hours, respectively, after which the dimensional changes are measured. The result of Example 12 is shown in Table 4.

TABLE 4

Results of Examples 11 to 12

| | Temperature (° C.) | Shrinkage (%) |
|---|---|---|
| Example 11 | 100 | 0 |
| | 600 | 0 |
| | 900 | 11.7 |
| Example 12 | 100 | 0 |
| | 600 | 0 |
| | 900 | 1 |

As shown in Table 4, the aerogels according to Examples 11-12 show an extremely low shrinkage at a high temperature. For example, the aerogels exhibit no shrinkage (0%) after they are heated at 100° C. and 600° C. for 24 hours in Examples 11-12. Even at a higher temperature of 900° C., the aerogel exhibits a shrinkage of 1.7% at most in Example 11, after it is heated for 24 hours. As commonly known, as the temperature increases, the particles of $SiO_2/TiO_2$ begin to sinter and fuse together, changing the nature of the structure and increasing the solid conduction component of heat transfer. However, With the microporous insulation structure according to the present invention, an extremely low shrinkage may be obtained, which would rarely have any influence on the effective performance when used in a pouch cell.

Comparative Example 5

Mica (IEC-60371-2, AXIM MICA) with a 3×3 mm² area and a thickness of 1 mm is used as a test piece in this example.
Measurement of Compression Set The mica is compressed by a load of 10 kg (5×5 mm²) for 1 h. The thickness of the test piece before compression test and after compression test are recorded to determine the compression set of the test piece according to the following equation.

$$\text{compression set } (\%) = (t_0-t)/t_0,$$

wherein $t_0$ denotes a thickness of the test piece before compression test, and t denotes a thickness of the test piece after compression test.

The results of Comparative example 5 is shown in Table 5.

Example 13

The aerogel was prepared by the same process as that described in Example 1, except that the aerogel is prepared to have a 3×3 mm² area and thickness of 1 mm.
Measurement of Compression Set The obtained aerogel is compressed by a load of 10 kg (5×5 mm²) for 1 h. The thickness of the test piece before compression test and after compression test are recorded to determine the compression set of the test piece according to the equation in Comparative example 5. The result of Example 13 is shown in Table 5.

Example 14

The aerogel was prepared by the same process as that described in Example 1, except that the aerogel contains 63 wt % of $SiO_2/TiO_2$, 34 wt % of SiC and 3 wt % of glass fiber. The obtained aerogel is prepared to have a 3×3 mm² area and thickness of 1 mm.
Measurement of Compression Set The obtained aerogel is compressed by a load of 10 kg (5×5 mm²) for 1 h. The thickness of the test piece before compression test and after compression test are recorded to determine the compression set of the test piece according to the equation in Comparative example 5. The result of Example 14 is shown in Table 5.

TABLE 5

Results of Comparative Example 5, and Example 13-14.

| | Thickness before compression test | Thickness after compression test | Compression rate |
|---|---|---|---|
| Comparative example 5 | 1 mm | 0.99 mm | 1% |
| Example 13 | 1 mm | 0.85 mm | 15% |
| Exampe 14 | 1 mm | 0.89 mm | 11% |

Seen from the above Table 5, the aerogel materials as the inner layer of the composite thermal barrier material according to the present invention in Examples 13 to 14 have much higher Compression set (rate) as compared to the mica material in Comparative example 5, which shows that the composite thermal barrier material may be appropriately deformed when it is subjected to a compression force applied by the neighbor cells due to thermal expansion in a battery. Thus, it can be understood that the composite thermal barrier material according to the present invention can be compressible in order to accommodate the volumetric change during the operation of a lithium secondary battery, which is advantageous particularly for the applications in a pouch cell.

While specific embodiments of the present invention have been described above, various applications and modifications will become readily apparent to those skilled in the art without departing from the scope of the present invention.

What is claimed is:

1. A multi-layer composite material having a sandwich structure used as a thermal barrier material in a pouch cell pack, which is compressible to accommodate a volumetric change of the pouch cell pack, comprising:
    an inner layer consisting of an aerogel material which has a thermal conductivity of 25 mW/m-K or less; and
    two thermal conduction layers which contain graphene based nano carbon and possess a thermal conductivity of 50 W/m-K or more,
    wherein the inner layer is sandwiched by the two thermal conduction layers, and
    wherein the graphene based layer is a binder-free layer which contains graphene powder and a carbon nano tube, the carbon nano tube being included in an amount of 15% to 30% by weight based on the total weight of the graphene based layer,
    wherein the inner layer has a thickness of 200 µm or more and 1000 µm or less.
2. The multi-layer composite material according to claim 1, wherein the inner layer has a thickness of 400 µm or more and 900 µm or less.
3. The multi-layer composite material according to claim 1, wherein the aerogel material has an air volumetric percentage of larger than 95%.
4. The multi-layer composite material according to claim 1, wherein the aerogel material contains an opacifier and a binder.
5. The multi-layer composite material according to claim 4, wherein the opacifier is selected from the group consisting of SiC, TiO2 and carbon black, and wherein the binder is glass fiber.
6. The multi-layer composite material according to claim 1, wherein the graphene based layer has a thickness of 1 to 100 µm.

7. A pouch cell pack comprising a plurality of cells and spacers disposed between the two neighbor cells, wherein the spacer contains the multi-layer composite material according to claim 1.

8. The pouch cell pack according to claim 7, wherein the inner layer has a thickness of 400 μm or more and 900 μm or less.

9. The pouch cell pack according to claim 7, wherein the aerogel material has an air volumetric percentage of larger than 95%.

10. The pouch cell pack according to claim 7, wherein the aerogel material contains an opacifier selected from the group consisting of SiC, TiO2 and carbon black, and a glass fiber binder.

11. The pouch cell pack according to claim 7, wherein the graphene based layer has a thickness of 1 to 100 μm.

12. The pouch cell pack according to claim 7, wherein the aerogel material of the multi-layer composite material has a compression set of at least 10%.

13. The multi-layer composite material according to claim 1, wherein the aerogel material has a compression set of at least 10%.

14. The multi-layer composite material according to claim 13, wherein the aerogel material has a compression set of between 10% and 15%.

15. A method for preparing the multi-layer composite material according to claim 1, comprising:
performing a process of forming the inner layer of an aerogel material; and
performing a process of applying the thermal conduction layers on both sides of the inner layer.

16. The method according to claim 15, wherein the aerogel material has an air volumetric percentage of larger than 95%.

17. The method according to claim 15, wherein the aerogel material contains an opacifier and a binder.

18. The method according to claim 17, wherein the opacifier is selected from the group consisting of SiC, TiO2 and carbon black, and wherein the binder is glass fiber.

19. The method according to claim 15, wherein the graphene based layer has a thickness of 1 to 100 μm.

* * * * *